July 14, 1964  D. H. HOWRY  3,140,600
LIQUID IMMERSION ULTRASONIC APPARATUS AND METHOD FOR THE
NON-DESTRUCTIVE TESTING OF SOLID BODIES
Filed Jan. 15, 1960  2 Sheets-Sheet 1

INVENTOR.
Douglass H. Howry

BY

ATTORNEYS

July 14, 1964  D. H. HOWRY  3,140,600
LIQUID IMMERSION ULTRASONIC APPARATUS AND METHOD FOR THE
NON-DESTRUCTIVE TESTING OF SOLID BODIES
Filed Jan. 15, 1960  2 Sheets-Sheet 2
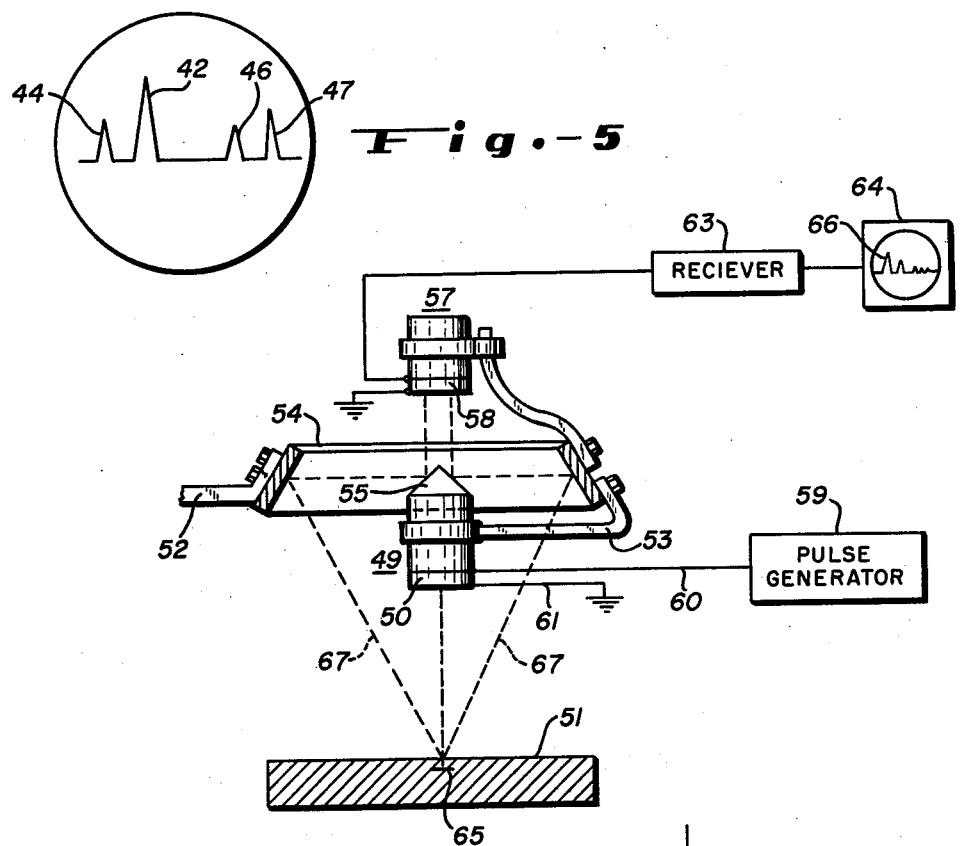
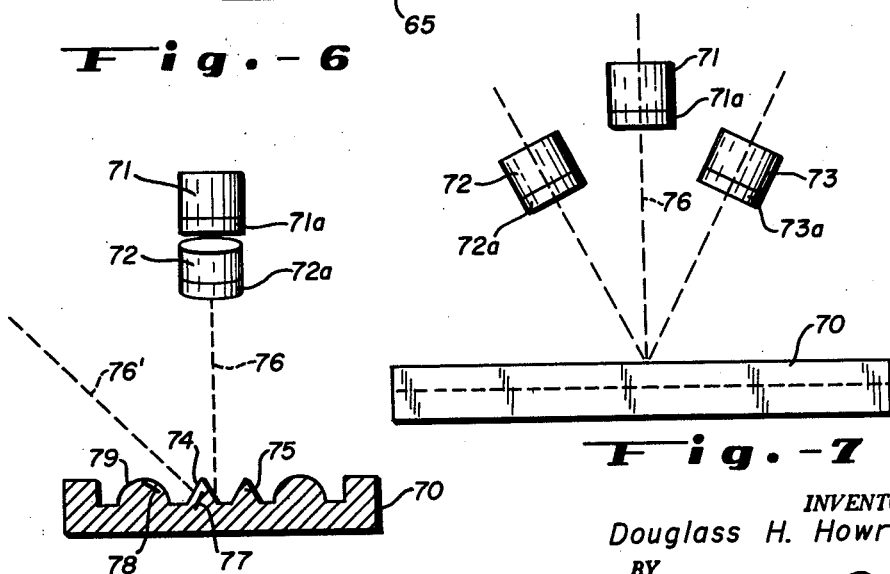
INVENTOR.
Douglass H. Howry
BY
ATTORNEYS

United States Patent Office 3,140,600
Patented July 14, 1964

3,140,600
LIQUID IMMERSION ULTRASONIC APPARATUS AND METHOD FOR THE NON-DESTRUCTIVE TESTING OF SOLID BODIES
Douglass H. Howry, Boulder, Colo., assignor to Elm Research Laboratories, Inc., Boulder, Colo., a corporation of Colorado
Filed Jan. 15, 1960, Ser. No. 2,774
7 Claims. (Cl. 73—67.7)

This invention relates to devices for the non-destructive testing of solid bodies and particularly to an improved apparatus and method of the type employing ultrasonic energy for the location of faults or discontinuities lying closely below the surface of solid bodies.

Apparatus which employs ultrasonic energy is now used extensively for locating flaws or discontinuities in solid bodies such for example as metal castings. This apparatus usually includes an electroacoustic transducer for directing a beam or a series of bursts of ultrasonic wave energy through a liquid coupling body into the object to be tested; the same transducer or a separate transducer is employed for receiving echoes from the object. The echoes received are then supplied to an oscillograph or other device which forms a visual representation of the echoes from the surface of the object and from discontinuities within the object such that the distance between the surface and a discontinuity may be determined.

Apparatus of this type has proved highly successful in the detection and location of flaws within metal forgings and other solid bodies; difficulty has been encountered, however, when a flaw within the body lies very near the surface. Accordingly, it is an object of this invention to provide an ultrasonic apparatus and method for the detection of discontinuities within solid bodies which includes an improved arrangement for detecting and locating discontinuities which lie within the body very close to the surface thereof.

It is another object of this invention to provide an ultrasonic energy apparatus for the detection of discontinuities within solid bodies and including an improved arrangement for securing positive detection of discontinuities lying within the bodies very near the surface thereof and for securing accurate measurement of the depth of the discontinuity below the surface.

In carrying out the objects of this invention in one embodiment thereof an ultrasonic wave apparatus is provided for examining the interior structures of solid bodies of matter which includes a transducer for directing a beam of ultrasonic energy through a liquid against the surface of the body to be examined. A second transducer is mounted as a receiving transducer on an axis at an angle of about 27° to that of the transmitting transducer. When this apparatus is employed to examine the interior of a body of matter having a substantially plane surface, the transmitted beam is directed along a path normal to the surface and the auxiliary receiving transducer receives echoes from discontinuities within the body. Substantially no echoes from the surface of the body reach the auxiliary transducer. The apparatus also includes receiving equipment for utilizing echoes received by both transducers and for presenting a visual representation on a fluorescent screen.

By locating the auxiliary transducer at a shorter distance from the surface than the transmitting transducer, and so that the zone of intersection of the axes of the two transducers is near the surface, it is possible to show the echo from a flaw very close to the surface as a pip or wave preceding the pip or wave representing the echo from the surface of the object. Thus a positive identification of a flaw so close to the surface that its echo cannot be distinguished from that from the surface when received by the transmitting transducer is made clearly visible on the screen.

In another embodiment of the invention a conical reflecting surface is employed for receiving energy along an axis of about 27° from the axis of a transmitter transducer positioned normal to the surface of the body being examined. The energy reflected from the conical reflector is then directed to a receiving transducer arranged axially in alignment with the transmitting transducer so that it is not subject to energy reflected directly from the surface. As the object is scanned with the transmitter and receiving reflector, echoes from discontinuities within the body will be received by the receiving transmitter and can be represented accordingly. The arrangement of the conical reflector assures the receiving of energy regardless of the surface characteristics of the flaw within the body.

The features of novelty which characterize the invention will be pointed out with particularity in the claims annexed to and forming a part of this specification. The invention itself, however, as to both its organization and method of operation, will be better understood upon reference to the accompanying drawings in which:

FIG. 5 is an enlarged view of the cathode ray screen of the apparatus of FIG. 1;

FIG. 6 is a diagrammatic view of another embodiment of the invention; and

FIGS. 7 and 8 are diagrammatic views illustrating a further embodiment of the invention.

Figure 1:
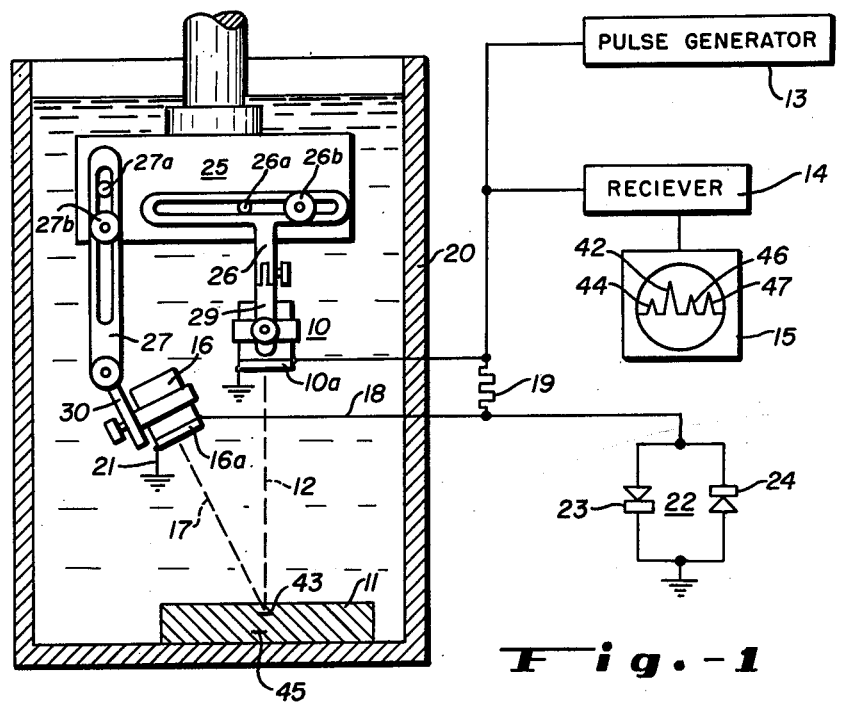
FIG. 1 is a schematic diagram of a testing apparatus embodying the invention.

Referring now to the drawing, the testing apparatus illustrated in FIG. 1 includes an electroacoustic transducer 10 which has been illustrated as located on an axis normal to the surface of a body 11 which is to be tested, the axis being indicated by dotted line 12. The transducer 10 includes a piezoelectric crystal 10a and is arranged to be energized by a pulse generator and amplifier 13 and is also arranged to be utilized as a receiving transducer, it being connected to a receiver 14 which is provided with a cathode ray device 15 for forming a visual representation of the received echoes.

A second transducer 16 is mounted at one side of the axis 12 of the transducer 10 and on an axis indicated by dotted line 17 which is at an angle of approximately 27° to that of the axis 12, the intersecting zone of the two axes lying generally within the object 11. The transducer 16 is employed at a receiving transducer and includes a piezoelectric crystal 16a which has its back face connected through a line 18 to the pulse generator 13 and receiver 14 through a limiting resistance 19. The opposite electrode of the crystal 16a is grounded through a lead 21. The line 18 is connected to ground through a high-voltage shorting device or bypass element 22 of the double diode type, which comprises two oppositely oriented diodes 23 and 24 connected in parallel between the line 18 and ground.

The testing apparatus includes a supporting head 25 for holding the transducers immersed in a body of liquid in a tank 20. The head has adjustable brackets 26 and 27 for holding the transducers 10 and 16 respectively in their required positions so that their axes may be maintained at the angle of about 27°. The transducers are mounted on the brackets 26 and 27 on pivotally adjustable arms 29 and 30 which afford individual adjustment of the angular positions of the transducers. The brackets 27 and 26 are slidably mounted on the head 25 for vertical and horizontal adjustment, respectively. The brackets are slotted, the slots engaging fixed pins 26a and 27a and locking screws 26b and 27b, respectively, which afford the desired horizontal and vertical adjustment. When the transducer 10 is excited by a pulse from the generator 13, a burst of ultrasonic energy is directed through the liquid medium in which the body 11 is immersed, the body being illustrated as resting on the bottom of the tank 20. The transducer 16 will not be energized because the high-voltage signal is bypassed through the diode device 22; at the same time the resistance 19 acts to limit the current and maintain the required voltage across the crystal 10a of the transducer 10. Ultrasonic wave energy reflected from the object 11 will be received by the transducers 10 and 16 in a manner to be described below.

When a sound wave is directed through a liquid against a solid body having a substantially plane surface, a portion of the wave energy is reflected from the surface of the body and, provided the energy is directed toward the body within critical angles, a portion of the energy enters the body and is transmitted through the body along paths depending upon the velocity of sound in the body and the mode of vibration of the energy. Sound energy traveling into a solid body may exhibit both a longitudinal and a transverse or shear mode of vibration.

When the angle exceeds the critical angle for each mode, energy in that respective mode is no longer transmitted into the solid body. In a similar manner energy traveling within the solid body will be transmitted into the liquid within a zone determined by the same critical angles for the two modes of vibration.

Figure 2:
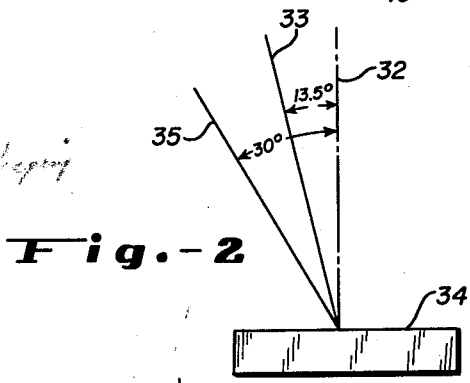
FIG. 2 is a diagrammatic illustration of the refraction characteristics of the equipment.

In FIG. 2 there are illustrated the critical angles for refraction of ultrasonic energy passing between a liquid and an aluminum plate. The critical angle for the longitudinal or L-mode in aluminum is 13.5°, as indicated by the angle between the perpendicular axis 32 and a line 33. When a beam of energy is directed against the plane surface of the aluminum body such as indicated at 34 within the angle of 13.5°, a portion of the L-mode energy enters the body and is propagated through it. When the angle exceeds 13.5°, all of the energy is reflected and none enters the solid body.

In a similar manner, for the S-mode or shear wave the critical angle is 30°, as indicated by the line 35, and no energy in this mode will enter the body when the angle exceeds 30°.

Figure 3:
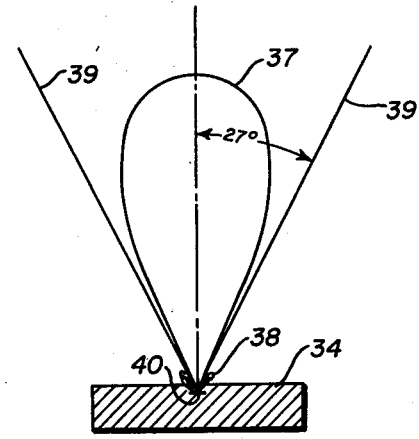
FIG. 3 is a curve illustrating the surface reflecting characteristics of the equipment.

The present invention is based on the discovery that, contrary to the generally accepted theory, sound energy may be transmitted from a solid body through a liquid medium at angles exceeding the critical angle when a discontinuity is present below the plane surface of the body. The exact phenomenon which occurs is not fully understood; however, it may be some manifestation of the Rayleigh or surface wave which is not lost in spite of the damping effect of the liquid in contact with the plane surface of the object. It has been found, for example, as indicated by FIG. 3, that when a burst of ultrasonic energy is directed against the plane surface of an object such as the plate 34, there is reflected from the surface a wave having an intensity curve generally of the form indicated at 37 but having some small side lobes of energy such as indicated at 38 about the base of the intensity curve. This curve or beam 37 represents the intensity of the reflected energy and falls off some 60 to 80 decibels at an angle of about 27° from the normal to the plane surface of the object 34 and indicated at 39. If a discontinuity or flaw such as indicated at 40 is present within the metal body, sound energy is reflected by the flaw and transmitted at intensities represented by an envelope 41 in FIG. 4. It will be noted that some energy is transmitted at all angles from the surface and that energy exists even at 90° to the axis normal to the top plane surface of the object 34, and that energy of relatively high intensity exists at an angle of about 27° to the normal axis.

This reflection of echoes from the discontinuity 40 into the liquid appears to contradict the expected characteristic based on the critical angles of refraction described in connection with FIG. 2.

Figure 4:
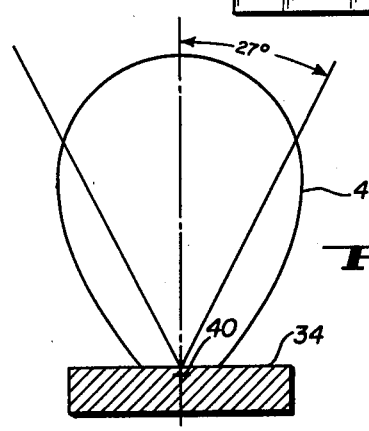
FIG. 4 is a curve illustrating the flaw echo characteristics.

The characteristics just described with reference to FIGS. 3 and 4 are employed in the testing equipment of FIG. 1 wherein the axes of the transducers 10 and 16 are positioned about 27° apart. When a burst of sound energy is transmitted by the transducer 10 toward the metal object 11, it is reflected and the echoes return to the transducer 10 and appear as a peaked wave indicated at 42 on the scope 15 and shown in FIG. 1 and in the enlarged view, FIG. 5. The echo returning from the plane surface is of the general wave form indicated in FIG. 3 and substantially none of this echo reaches the transducer 16 along the path 17. However, if a discontinuity such as indicated at 43 is present in the block 11, an echo wave will return from the discontinuity which will have a characteristic as indicated in FIG. 4 and energy of substantial intensity will reach the transducer 16. Energy from this echo will of course also reach the transducer 10 but, when the discontinuity 43 is very close to the surface of the object 11, this echo will substantially merge with that reflected from the surface and will be indiscernible although it is a portion of the peaked wave 42.

The energy reaching the transducer 16 will produce a signal and in the illustrated apparatus the transducer 16 is arranged nearer to the block 11 than the transducer 10 and consequently the echo signal will reach the transducer 16 before the echoes return to the transducer 10. These echoes will produce a peaked wave or pip 44 as indicated on the screen of the device 15 and in FIG. 5. By providing this shortened path the echo reaches the receiver 14 a sufficient time ahead of the echo returning from the surface that it may be distinguished as a separate wave preceding the initial echo from the surface. Echoes from deeper discontinuities such as a flaw 45 will reach the receiver 14 after the initial peak 42, as indicated by a peak wave 46, and an echo from the back surface will follow as indicated at 47.

It will thus be apparent that an echo from a discontinuity close to the surface of an object may be received as a separate discrete peak of the trace on the fluorescent screen and may be distinguished clearly because it has been represented as preceding the surface echo. Thus positive detection of flaws close to the surface is made possible by this apparatus.

When an equipment of the foregoing type is required solely for detecting the presence of flaws in solid objects as distinguished from determining their precise location with respect to the front surface, an arrangement such as that illustrated in FIG. 6 may be employed for submersion in a tank in the same manner as the embodiment of FIG. 1. In this figure a transmitting transducer 49 having a crystal 50 is employed for directing a beam of ultrasonic energy through the body of liquid (not shown) along a path normal to a substantially plane surface of an object such as represented at 51. The transducer 49 is carried on a bracket 52 connected to a suitable support (not shown) and is mounted on an arm 53 connected to a frusto-conical ring 54. The ring 54 is concentric with the transducer 49 and is positioned so that echoes received from the object 51 along paths at substantially 27° to the axis of the transducer are directed against the inner surface of the ring and are then reflected to a conical reflector 55 mounted as a top portion of the transducer assembly 49 and are then reflected to a receiving transducer 57 mounted directly above the transducer 49 on the same axis. The transducer 57 is of the same construction as the transducer 49 and includes a piezoelectric crystal 58.

The transducer 49 is energized by a pulse generator 59 connected to the upper electrode of the crystal 50 by a lead 60, the opposite electrode of the crystal 50 being grounded through a connection 61. The transducer 57 is connected to a receiver 63 including a cathode ray screen device 64. The crystal 58 of the transducer 57 is connected between the receiver and ground in the same manner as the crystal 50 is connected to the generator.

During the operation of the apparatus of FIG. 6, when there are no discontinuities within the body 51 and provided both the front and the back surfaces are substantially plane, no echoes will be received by the transducer 57. However, should there be a flaw within the body 51 such as that indicated at 65, echoes will be reflected and will reach the cone 54 and be directed to the transducer 57, thereby giving an indication of the presence of the discontinuity or flaw. The visual representation on the screen of the device 64 may be a peaked wave such as that indicated at 66.

It will now be apparent that the apparatus of FIG. 6 may be employed for the rapid scanning of substantially plane-surfaced bodies such as rolled sheet metal to detect the presence of flaws so that the portions of metal found to contain flaws may be rejected for further inspection or scrapping. The ring 54 assures picking up of the signal at its greatest intensity about the complete 360° of the 27° cone of echoes represented by the dotted lines 67 of the echo path thereby minimizing effects due to any directional characteristics of the flaw 65.

While the transducers of the devices of FIGS. 1 and 6 have been illustrated as arranged to transmit and receive echoes along paths at about 27° to one another, it will be noted that this angle may be greater within the range of intensities available depending upon the intensity pattern of the echo wave reflected from the discontinuity. For example, it will be clear from FIG. 4 that while relatively high intensity of the echo is present for angles of around 27°, nevertheless an appreciable echo will be received even at close to 90° to the central axis. For most purposes it is desirable to use the angle which provides the highest intensity of the reflected echo consistent with the effective elimination of the direct echo from the surface as represented by the curve of FIG. 3.

Various arrangements of the apparatus employing an angle between the transmitted burst or beam and the received echoes which is of the order of 27° or higher may be utilized to assure positive identification of echoes received from within solid bodies having substantially plane surfaces. By way of example, there is illustrated somewhat diagrammatically in FIGS. 6 and 7 an application of the invention to the continuous examination or flaw testing of a strip of extruded metal having a cross section including both round and angular surfaces. As shown in these figures, an extruded metal member 70 is under test by an ultrasonic equipment including a transducer assembly having a transmitting transducer 71 and two receiving transducers 72 and 73. Each of these transducers is of essentially the same construction as those illustrated in the other embodiments and includes a piezoelectric crystal designated 71a, 72a and 73a, respectively. In these figures the supporting devices and the electronic circuitry have been omitted; it will be understood, however, that the various connections and the arrangement and adjustment of the parts may be made essentially the same as those in the preceding illustrations. The receiving transducers 72 and 73 may be connected in any suitable manner to the same or to separate receivers in order to secure a visual representation of echoes from the body 70.

The axes of the three transducers 71, 72 and 73 lie in the same plane and this plane is oriented so that the axis of the transmitting transducer 71 lies normal to the portion of the surface of the body 70 which is under examination and the plane is in alignment with the longitudinal axis of the body. Flaws in the body 70 may de detected by movement of the transducer assembly longitudinally of the body provided the transmitted energy is directed against a substantially plane surface which is also substantially perpendicular to the axis of the transducer 71.

In FIG. 7 the transmitting transducer has been illustrated in a position to direct energy at right angles to a flat surface of the body lying between two longitudinal ridges 74 and 75 which are each of generally triangular cross section. The axis or path of the transmitted energy is indicated generally by a dotted line 76 and, should there be a flaw directly below the flat surface between the ridges 74 and 75, echoes will be returned which may be received by the transducers 72 and 73 provided the plane of the axes of the three transducers is aligned longitudinally so that it lies generally parallel to the ridges.

If now it is desired to check flaws which may lie close to one of the ridges 74 and 75, for example a flaw 77 lying just below the left-hand sloping face of the ridge 74, it becomes necessary to reorient the axis 76 so that it lies perpendicular to this sloping surface as indicated by the second dotted line 76' in FIG. 8. The flaw 77 will then be located upon moving the transducer along the body with the axis 76' perpendicular to the face of the ridge 74 and the plane of the three transducers parallel to the ridge.

Should there be a flaw in a rounded ridge section of the body 70, for example a flaw as indicated at 78 within the rounded ridge indicated at 79, the axis 76 may be aligned with a radius of curvature of the arcuate surface 79 and passing through the center of curvature so that the plane of the three transducers passes through the central longitudinal axis of the curved section. In this application of the testing apparatus flaws near the surface of the arcuate section will be detected because there is a sufficient substantially plane area along the surface to act in the manner described above in connection with the flat surfaces and the flaw 78 will be detected by echoes received by the transducers 72 and 73. In order completely to scan a curved ridge such as the ridge 79, it is desirable to move the transmitting apparatus along the ridge at several different radial positions of the transmitting axis 76 about the central axis of curvature of the ridge 79.

It will thus be apparent that the apparatus may be employed to locate flaws along fluted or ridged bodies provided it is moved in the direction of the ridges rather than transversely thereto. The apparatus is thus suited to the testing of extruded sections such as that illustrated or to the common rolled sections such as T-, H- and I-beam sections.

While the invention has been described in connection with specific apparatus, various other applications and modifications will occur to those skilled in the art. Therefore it is not desired that the invention be limited to the specific details illustrated and described and it is intended by the appended claims to cover all modifications which fall within the spirit and scope of the invention.

I claim:

1. An ultrasonic wave apparatus of the liquid immersion type for the detection of discontinuities in solid bodies below substantially plane surfaces thereof which comprises means for transmitting ultrasonic energy through the liquid medium of the apparatus along a predetermined axis and into a body to be examined, means for supporting the body to be examined in spaced relationship to said transmitting means, means for exciting said transmitting means, means spaced from said body supporting means for receiving echoes of the transmitted energy reflected from the body under examination passing through the liquid medium along a path lying at an angle in the range of from about 27° up to 90° with respect to the axis of the transmitted energy whereby when said transmitting means directs energy along a path normal to a substantially plane surface of the body to be examined echoes reaching said receiving means from the plane surface are minimized and significant echoes from discontinuities in the body are received, and means connected with said receiving means and utilizing echoes received by said receiving means for indicating the presence of discontinuities in the body under examination.

2. An ultrasonic wave apparatus as set forth in claim 1 wherein the paths of the transmitted and echo energy are at an angle of about 27° to one another.

3. An ultrasonic wave apparatus as set forth in claim 1 wherein the zone of intersection of the transmitted energy axis and the echo path to said receiving means is nearer said receiving means than said transmitting means and wherein said echo utilizing means includes a receiver for utilizing echoes reaching both said receiving means and said transmitting means for providing an indication of the distance between the surface of the body under examination and discontinuities within the body.

4. An ultrasonic wave apparatus of the liquid immersion type for the detection of discontinuities in solid bodies below substantially plane surfaces thereof which comprises means for transmitting ultrasonic energy through the liquid medium of the apparatus along a predetermined axis and into a body to be examined, means for exciting said transmitting means, receiving means positioned behind said transmitting means and shielded by said transmitting means from direct echoes from the surface of the body under examination, reflecting means positioned to direct echoes from a body under examination to said receiving means, said reflecting means including an ultrasonic energy reflector positioned laterally of said transmitting means along an echo path lying at an angle of from about 27° up to 90° with respect to the axis of the transmitted energy whereby when the transmitted energy is directed normally against a substantially plane surface of the body to be examined echoes reaching said receiving means from the plane surface are minimized and significant echoes from discontinuities in the body are received, and means utilizing echoes received by said receiving means for indicating the presence of discontinuities in the body under examination.

5. An ultrasonic wave apparatus as set forth in claim 4 wherein said ultrasonic energy reflector comprises a ring positioned about said transmitting means substantially concentric with the axis of transmission and having an inner surface constituting a reflector for directing energy toward said receiving means from any point around 360° whereby echoes returning from the body along any path at said angle will be reflected to said receiving means.

6. In the non-destructive testing of solid bodies by the utilization of ultrasonic wave energy, the method of detecting discontinuities in a solid body close to a substantially plane surface thereof which comprises immersing the body in a liquid, directing ultrasonic energy through the liquid and against the body along a path substantially normal to the plane surface, receiving ultrasonic energy reflected from the body along a second path intersecting the first path in a zone including the area of the surface of the body against which the energy is directed and at an angle of at least about 27° to the path normal to the plane surface, and utilizing echoes received along the second path for indicating the presence of discontinuities in the body in the zone of intersection of the first and second paths.

7. The method of non-destructive testing of solid bodies as set forth in claim 6 including the further steps of locating the second transducer substantially nearer to the object under test than the first transducer, employing both transducers for receiving echoes from the body, and utilizing the echoes received by both transducers to form a visual representation of the echoes.

References Cited in the file of this patent

UNITED STATES PATENTS

| | | |
|---|---|---|
| 2,536,128 | Firestone et al. | Jan. 2, 1951 |
| 2,592,135 | Firestone | Apr. 8, 1952 |
| 2,893,239 | Renaut | July 7, 1959 |

OTHER REFERENCES

"Ultrasonics and Their Use For Non-Destructive Testing of Materials," by N. G. Neuweiler, Microtechnic, vol. IV, No. 2, pp. 60–66.

McMaster, Robert C.: Nondestructive Testing Handbook, New York, Ronald Press, 1959 (section 45, pages 11 and 12 relied on).